July 25, 1967 — J. E. BORAH — 3,332,515

LUBRICATING FIXTURE GUARD

Filed March 12, 1965 — 2 Sheets-Sheet 1

INVENTOR.
JOHN E. BORAH
BY M. A. Hobbs
ATTORNEY

3,332,515
LUBRICATING FIXTURE GUARD
John E. Borah, 815 Mishawaka Ave., Mishawaka, Ind. 46544
Filed Mar. 12, 1965, Ser. No. 439,410
6 Claims. (Cl. 184—88)

The present invention relates to a protective member and more particularly to a combination guard and cap for protecting lubricating fixtures for bearings and other moving machine parts.

Lubricating fixtures extensively used for bearings and the like consist of a small protruding member having a small outer end for receiving a nozzle of a lubricating gun or tube and having a lubricant passage and a small check valve in the outer end which admits the lubricant but prevents its from leaking from the bearing. Under many operating conditions the fixtures becomes covered with dirt, grime and other foreign matter and when the bearings are lubricated the foreign material either interferes with the normal connection of the lubricating nozzle, or small but injurious amounts of the material are carried into the bearings. Further, in machinery used in adverse conditions, such as in water, slush, mud and the like, the fixtures may be ineffective in excluding the water and foreign material from the bearings while the machinery is in use, thus causing damage to the bearings and other moving parts. Caps have been used in the past to protect the lubricating fixtures; however, they have been ineffective in many instances in excluding the water and foreign materials or have been easily accidentally removed by bumping or rubbing against other objects, thus exposing the fixtures to the adverse operating conditions, or the caps have not completely enclosed the portion of the fixture contacted by the lubricating nozzle so that the grime, dirt and other foreign matter eventually find their way into the fixtures as successive bearings are lubricated. It is therefore one of the principal objects of the present invention to provide a cap for lubricating fixtures, which encloses the entire exposed surface of the fixture and forms an effective fluid-tight seal at several different places along the fixture and at the lubricating opening in the outer end thereof, and which is so shaped that it can be readily removed from the fixture and easily replaced without the use of any tools or special equipment.

Another object of the invention is to provide a cap and guard structure for lubricating fixtures which is so constructed and designed that it will automatically lock itself in place and will remain firmly attached to the fixture until intentionally removed, and which can be easily grasped and firmly held by the operator's hands in installing and removing it from a fixture.

In many bearings and fixture installations, the fixture projects outwardly from a flat surface and is in close proximity thereto. The present cap and guard structure takes advantage of the adjacent flat surface to form an effective seal which fully protects the entire fixture from dirt and grime and maintains the fixture in satisfactory operating condition for receiving the lubricating nozzle or gun. It is therefore an additional object of the present invention to provide a guard and cap structure of the aforesaid type which not only seats onto the adjacent flat surface, but in which the end of the structure forming the seal is forcibly held under pressure against the surface by the relationship between the internal surface of the cap structure and the external surface of the fixture.

Since the lubricating fixtures often project outwardly from the bearing structures or other machine parts being lubricated by the fixtures, they are occasionally bumped or rubber by extraneous objects, and occasionally knocked off or seriously damaged. The present guard and cap structure forms an effective guard which not only forms an effective seal, but also serves as an effective bumper element for absorbing blows and bumps or other pressures which would otherwise damage the fixture.

Additional objects and advantages of the present invention will become apparent from the following description and accompanying drawings, wherein.

Figure 2:
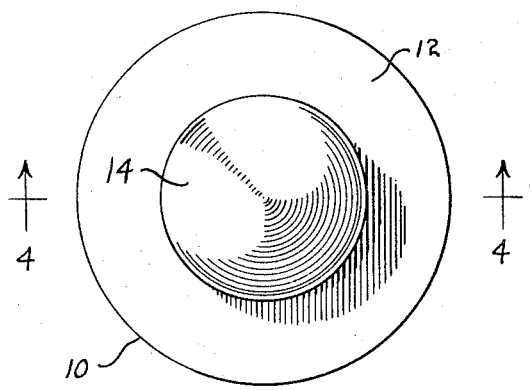
FIGURE 2 is a top plan view of the fixture guard shown in FIGURE 1.

Referring more specifically to the drawings, numeral 10 designates generally the present lubricating fixture guard, having a generally cylindrically shaped body 12 and a dome shaped head 14, the two being formed of rubber or rubber-like material such as neoprene, and being joined integrally to one another. The body and head contain a cavity 16 of the general configuration of a lubricating fixture, consisting of an upper cavity portion 18, a restricted portion 20 with curved or tapered side walls 22, and an enlarged portion 24. The cavity is restricted at the bottom opening 26 by an inwardly extending annular flange 28, the flange being wedge shaped in cross sectional configuration, so that it can extend inwardly into the relatively small space between the fixture and the supporting structure 30 and form an effective seal therebetween. Inner end 32 of the cavity is provided with a protrusion 34 which assists in forming an effective seal between the cap and fixture, as will be more fully explained hereinafter.

In order to assist in removing and replacing the fixture, the outer surface of body 12 is provided with an inwardly or downwardly tapered surface 40 which provides an effective gripping surface for the fingers and thumb. The relatively substantial thickness of the body at this tapered portion gives sufficient firmness to the gripping surface to prevent it from being significantly distorted when pressure is applied during the removing and installing operations. The dome shaped head 14, which forms the most protruding portion of the cap, is rounded to minimize the possibility of the cap being accidently displaced by bumping. The lower or open end 41 of body 12 is provided with an extra length 42 over and above that required to fully fill the space between the end of the fixture and the supporting structure 30, so that the cap will seat firmly against the surface 44 of the supporting structure. The lower end will be slightly distorted or compressed when it seats on the supporting surface and will provide a relatively broad sealing contact area.

The material from which the present fixture is made is preferably rubber or rubber-like material, such as neoprene, with sufficient flexibility to permit the body 12 to distort while it is being seated on or removed from the fixture, and yet sufficiently resilient that it will seat firmly onto the fixture, and conform readily and effectively to the contoured surface thereof. The body portion is, however, sufficiently rigid that the tapered portion 40 will not distort sufficiently to interfere with an effective holding surface for installing and removing the cap.

Figure 3:
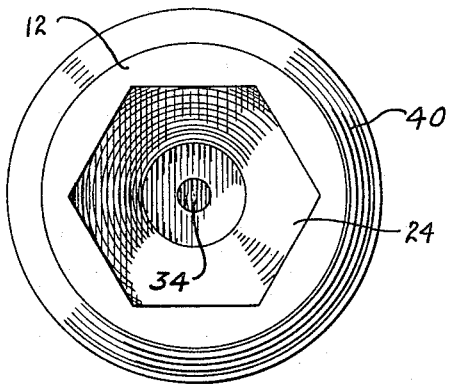
FIGURE 3 is a bottom view of the present fixture guard.
Figure 1:
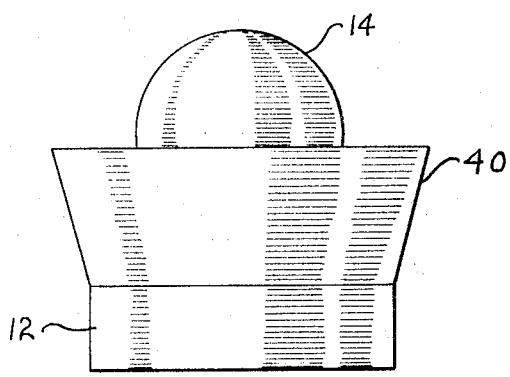
FIGURE 1 is a side elevational view of the present lubricating fixture guard and cap combination.
Figure 5:
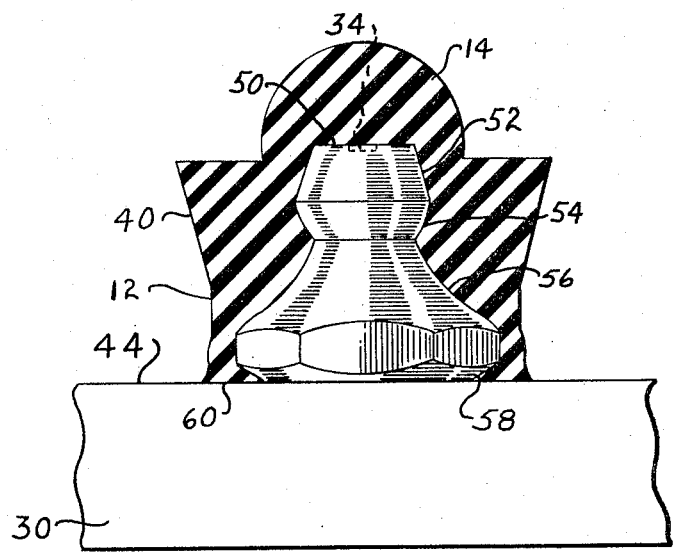
FIGURE 5 is a cross sectional view similar to that shown in FIGURE 4, illustrating the manner in which the present cap effects a fluid-tight seal around and over the fixture.

One of the important features of the present lubricating fixture cap is the effective sealing surfaces formed between the cap and the fixture and the cap and the surface of the supporting structure, as can readily be seen from FIGURE 5, wherein a seal is formed at surfaces 50, 52, 54, 56, 58 and 60. A further effective seal may be provided between projection 34 and the outer or the inlet end of the fixture. When the cap is placed on the fixture, the restricting effect of tapered surface 22 and point 54 urges the cap inwardly toward the supporting structure, seating the end 41 firmly on the surface of the supporting structure as well as retaining lip or annular projection 28 in the space between the end of the cap and surface 44. The co-action between tapered surface 22 and the corresponding surface on the fixture likewise presses projection 34 onto the fixture, seating it firmly around and over the lubricating opening of the fixture. Lower opening 26 to cavity 16 is hexagonal in shape, as can be readily seen in FIGURE 3; however, the cap has sufficient flexibility and resilience to form an effective seal around the hexagonal portion of the fixture, regardless of whether the hexagonal side walls of the opening match the hexagonal surfaces of the fixture or not. A more effective seal can be obtained by rotating the cap sufficiently to match the flat surfaces of opening 26 with the surfaces on the hexagonal portion of the fixture.

In the use of the present cap, it is installed on the fixture after the bearing or other moving machine parts have been lubricated, by merely pressing it onto the fixture, preferably with a slight rotating motion. The cap seats at the various sealing surfaces 50, 52, 54, 56, 58 and 60 and forms an effective seal throughout substantially the entire external surface of the fixture and the internal wall of cavity 16. The tapered surface 22 urges the cap against surface 44 to form seal 60 and to seat annular lip 28 in the annular space between the end of the fixture and surface 44. Simultaneously, the wall defining the upper end of cavity 16 seats on the upper end of the fixture and protrusion 34 seats over the lubricating inlet of the fixture. With the cap in this position six sealing points are formed, which protect the fixture from moisture, dirt and grime, and the relatively heavy body 12 with the thicker tapered portion 40 and rounded head portion 14 protects the fixture from the bumping and rubbing action of foreign objects. The present cap will effectively prevent water from entering the fixture when the fixture is immersed in water, mud or slush, and will effectively exclude foreign particles suspended in the fluid. When the fixture is to be lubricated, the cap can be readily removed by the operator's merely grasping the tapered surface and pulling the cap outwardly, preferably with a slight rotating motion. The cap can be used indefinitely to form an effective protective and sealing structure around the fixture and can be removed and replaced numerous times without causing any diminution in the effectiveness of the seal.

Figure 4:
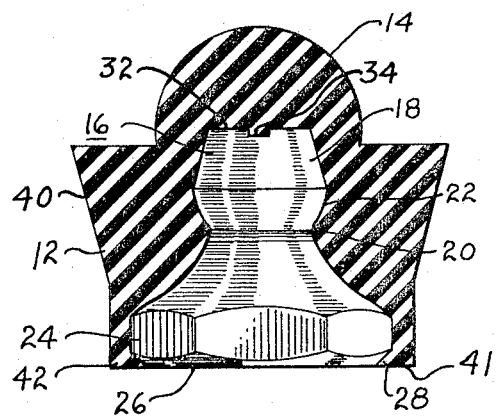
FIGURE 4 is a vertical cross sectional view of the present cap, the section being taken on line 4—4 of FIGURE 2.

It should be noted that the thickest portion of the side wall of the present guard is spaced downwardly from the small end of the fixture, as viewed in FIGURES 4 and 5, and hence, when the guard is bumped or rubbed, there is little tendency to displace or dislodge the guard from the fixture, since the force of the bump is transmitted toward the fixture. Further, the protruding outer edges of tapered portion 40, along with head portion 14, tend to deflect or absorb the force of any blows or bumps so that the fixture will not be damaged or dislodged.

While only one embodiment of the present lubricating fixture and with the general configuration of the external various changes and modifications may be made without departing from the scope of the invention.

I claim:
1. In combination with a lubricating fixture having a neck, an outwardly flaring annular portion, and an opening in the outer end for receiving lubricant, and with a supporting structure with a surface adjacent said fixture of a larger area than the adjacent end of said fixture: a lubricating fixture cap comprising a body having internal walls forming a cavity with an open end for receiving the fixture and with the general configuration of the external surface of said fixture, including a flaring annular portion for engaging said flaring annular portion on said ture, and an annular lip on said body disposed around said open end and projecting beyond the cavity sufficiently to seat firmly on the adjacent surface of the supporting structure when said flaring portions are in substantial registry with one another.

2. The combination of lubricating fixture, supporting surface and cap as defined in claim 1 in which said annular lip on said body portion is compressed and seated firmly on the supporting structure to form a seal therewith by the engagement of said flaring portion.

3. The combination of lubricating fixture, supporting surface and cap as defined in claim 1 in which a boss is provided on the internal end wall of the cap for engaging the outer end of the fixture and seating around the opening in the end of said fixture.

4. The combination of lubricating fixture, supporting surface and cap as defined in claim 1 in which said body has an outwardly tapered annular portion forming a thumb and finger grasping member.

5. The combination of lubricating fixture, supporting surface and cap as defined in claim 2 in which said annular lip has an inwardly extending annular member of wedge-shaped cross-sectional configuration.

6. The combination of lubricating fixture, supporting surface and cap as defined in claim 3 in which said body has an outwardly tapered annular portion forming a thumb and finger grasping member and a dome-shaped outer end member formed integrally with said body.

References Cited
UNITED STATES PATENTS

| 1,419,229 | 6/1922 | Critchlow | 184—105 |
| 2,379,529 | 7/1945 | Kennedy | 184—105 |
| 2,963,046 | 12/1960 | Goodrich | 138—89.2 |

FOREIGN PATENTS

| 700,529 | 12/1953 | Great Britain. |

LAVERNE D. GEIGER, *Primary Examiner.*

H. S. BELL, *Assistant Examiner.*